US008480372B2

(12) United States Patent
Sparks

(10) Patent No.: US 8,480,372 B2
(45) Date of Patent: Jul. 9, 2013

(54) SYSTEM AND METHOD FOR REDUCING BUCKET TIP LOSSES

(75) Inventor: Scott Matthew Sparks, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 1092 days.

(21) Appl. No.: 12/265,995

(22) Filed: Nov. 6, 2008

(65) Prior Publication Data

US 2010/0111674 A1 May 6, 2010

(51) Int. Cl.

| | |
|---|---|
| ***B63H 1/26*** | (2006.01) |
| ***B63H 7/02*** | (2006.01) |
| ***B64C 27/46*** | (2006.01) |
| ***B64C 11/16*** | (2006.01) |
| ***F03B 3/12*** | (2006.01) |
| ***F03B 7/00*** | (2006.01) |
| ***F03D 11/02*** | (2006.01) |
| ***F04D 29/38*** | (2006.01) |
| ***F01D 5/14*** | (2006.01) |

(52) U.S. Cl.
USPC ........ 416/238; 416/223 A; 416/242; 416/235; 416/243; 416/228; 416/237; 416/97 R

(58) Field of Classification Search
None
See application file for complete search history.

(56) References Cited

U.S. PATENT DOCUMENTS

| | | | | |
|---|---|---|---|---|
| 4,585,395 | A * | 4/1986 | Nourse et al. | 416/223 A |
| 4,682,935 | A * | 7/1987 | Martin | 416/223 A |
| 5,525,038 | A | 6/1996 | Sharma et al. | |
| 6,331,100 | B1 * | 12/2001 | Liu et al. | 416/238 |
| 6,672,829 | B1 | 1/2004 | Cherry et al. | |
| 7,217,101 | B2 | 5/2007 | Harvey | |

* cited by examiner

*Primary Examiner* — Julio J Maldonado
*Assistant Examiner* — Shantanu C Pathak
(74) *Attorney, Agent, or Firm* — Cantor Colburn LLP

(57) ABSTRACT

A system including an airfoil portion of an unshrouded turbine bucket, which includes a pressure-side surface and suction-side surface each extending from a root surface to a tip surface and joined at a leading edge and a trailing edge, the pressure-side surface having a generally concave shape and the suction-side surface having a generally convex shape; the airfoil portion having an increasing stagger angle in a spanwise direction from the root surface to the tip surface and an increasingly loaded suction-side surface as the suction-side surface approaches the tip surface and the tip surface approaches the leading edge, the airfoil portion having a resultant lean in a direction of the suction-side surface as the leading edge approaches the tip surface, and the pressure-side surface and the suction-side surface each having a locally reduced or reversed curvature in a direction of the pressure-side surface at their intersection with the tip surface.

19 Claims, 4 Drawing Sheets

SYSTEM AND METHOD FOR REDUCING BUCKET TIP LOSSES

BACKGROUND OF THE INVENTION

The subject matter disclosed herein relates generally to thermo-mechanical turbines, and more particularly to a system and method for reducing bucket tip losses.

Performance and efficiency of thermo-mechanical turbines, such as gas or steam turbines, is desirably improved by reducing losses in the thermal to mechanical energy conversion that occurs when high pressure gases (and/or fluids) are applied to turbine blades or "buckets" to cause mechanical rotation and energy output. Such losses often occur due to leakage past the buckets through clearances between the bucket tips and surrounding stationary components (such as shrouds, housings, etc.), which results in undesired pressure mixing and vortex flow generation. Reducing these "over-tip" and "tip-vortex" losses is particularly challenging for unshrouded bucket tip configurations, which are often used in one or more stages of turbines.

BRIEF DESCRIPTION OF THE INVENTION

According to one aspect of the invention, a system for reducing bucket tip losses includes an airfoil portion of an unshrouded turbine bucket. The airfoil portion includes a pressure-side surface and a suction-side surface each extending from a root surface to a tip surface and joined at a leading edge and a trailing edge. The pressure-side surface has a generally concave shape and the suction-side surface has a generally convex shape. The airfoil portion has an increasing stagger angle in a span-wise direction from the root surface to the tip surface and an increasingly loaded suction-side surface as the suction-side surface approaches the tip surface and the tip surface approaches the leading edge. The airfoil portion also has a resultant lean in a direction of the suction-side surface as the leading edge approaches the tip surface. Furthermore, the pressure-side surface and the suction-side surface each have a locally reduced or reversed curvature in a direction of the pressure-side surface at their intersection with the tip surface.

According to another aspect of the invention, a method for reducing bucket tip losses includes providing an airfoil portion of an unshrouded turbine bucket. The airfoil portion includes a pressure-side surface and a suction-side surface each extending from a root surface to a tip surface and joined at a leading edge and a trailing edge. The pressure-side surface has a generally concave shape and the suction-side surface has a generally convex shape. The airfoil portion has an increasing stagger angle in a span-wise direction from the root surface to the tip surface and an increasingly loaded suction-side surface as the suction-side surface approaches the tip surface and the tip surface approaches the leading edge. The airfoil portion also has a resultant lean in a direction of the suction-side surface as the leading edge approaches the tip surface. Furthermore, the pressure-side surface and the suction-side surface each have a locally reduced or reversed curvature in a direction of the pressure-side surface at their intersection with the tip surface.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In the following detailed description, numerous specific details are set forth in order to provide a thorough understanding of various embodiments. However, the embodiments may be practiced without these specific details. In other instances, well known methods, procedures, and components have not been described in detail.

Further, various operations may be described as multiple discrete steps performed in a manner that is helpful for understanding embodiments of the present invention. However, the order of description should not be construed as to imply that these operations need be performed in the order they are presented, or that they are even order dependent. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated.

Exemplary embodiments of the invention provide a system and method for reducing bucket tip losses, e.g., in a thermo-mechanical turbine. In accordance with such exemplary embodiments, over-tip and tip-vortex losses are reduced, e.g., in unshrouded bucket configurations. Row inlet flow near the bucket tip is redirected inboard, through body-forces, due to a suction-side down stacking arrangement in combination with a decreased over-tip flow coefficient due to a locally decreasing degree or reversed direction of curvature in the near-tip region.

Figure 1:
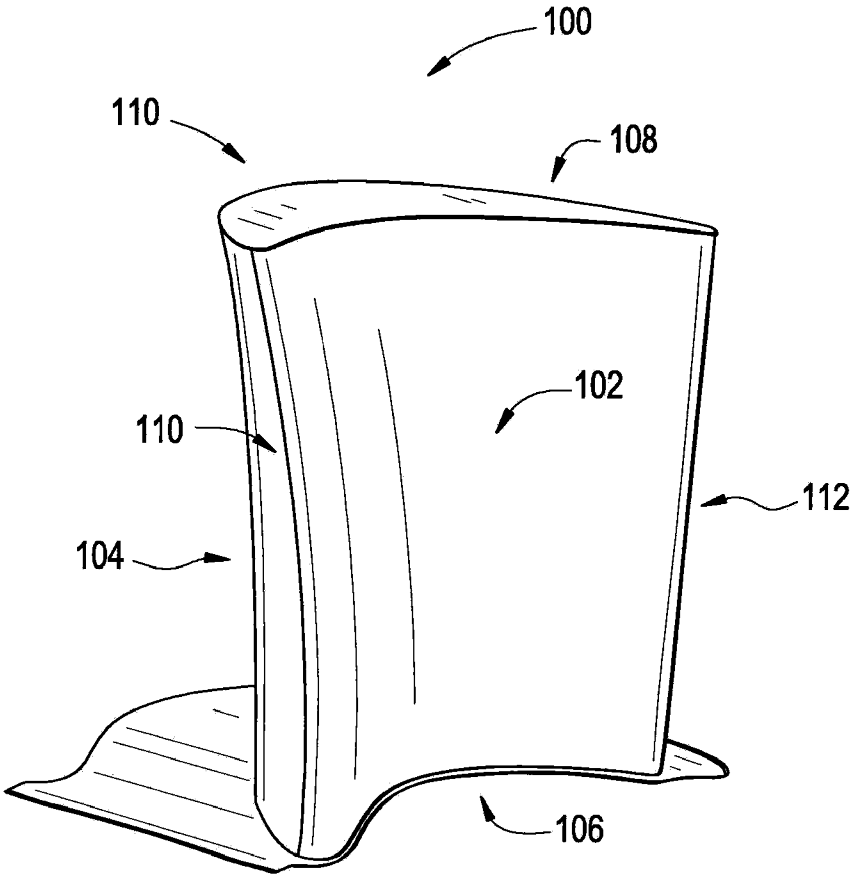
FIG. 1 is a diagram illustrating an exemplary perspective view of an airfoil portion of a turbine bucket in accordance with exemplary embodiments of the invention.

FIG. 1 is a diagram illustrating an exemplary perspective view of an airfoil portion 100 in accordance with exemplary embodiments of the invention. The airfoil portion 100 is, e.g., part of an unshrouded turbine bucket. The airfoil portion 100 includes a pressure-side surface 102 and a suction-side surface 104, which each extend from a root surface 106 to a tip surface 108 and are joined at a leading edge 110 and a trailing edge 112. The pressure-side surface 102 has a generally concave shape, and the suction-side surface 104 has a generally convex shape. The airfoil portion 100 has an increasing stagger angle in a span-wise direction from the root surface 106 to the tip surface 108 (as further depicted, e.g., in FIG. 4) and an increasingly loaded (e.g., front-loaded) suction-side surface 110 as the suction-side surface 104 approaches the tip surface 108 and the tip surface 108 approaches the leading edge 110. The airfoil portion 100 has a resultant lean in a direction of the suction-side surface 104 as the leading edge 110 approaches the tip surface 108 (as further depicted, e.g., in FIG. 3).

Figure 3:
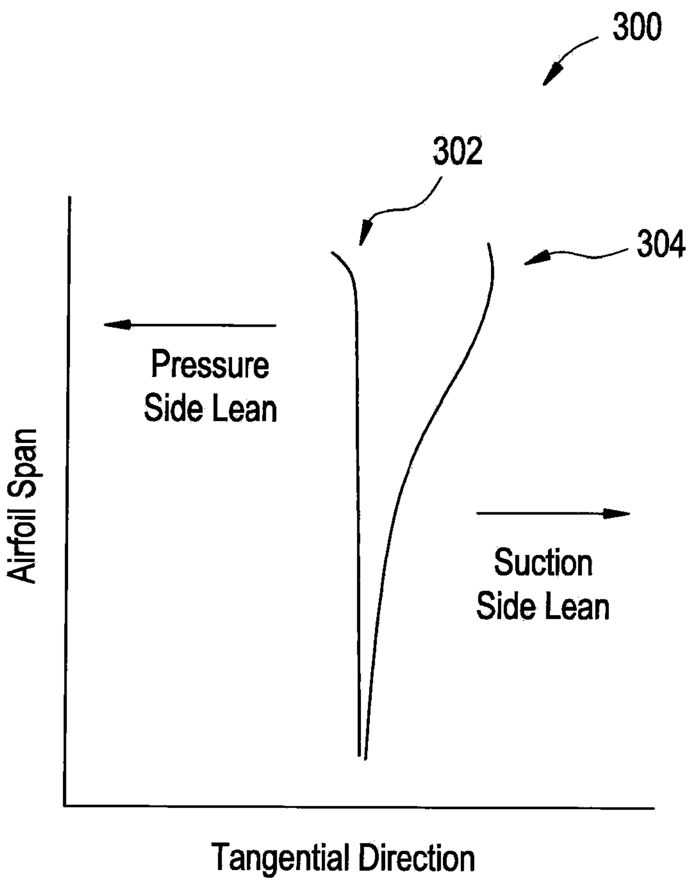
FIG. 3 is a line diagram illustrating an exemplary lean profile of the airfoil portion of FIG. 1 in accordance with exemplary embodiments of the invention.

Furthermore, the pressure-side surface 102 and the suction-side surface 104 each have a locally reduced or reversed curvature in a direction of the pressure-side surface 102 at their intersection with the tip surface 108 (as further depicted, e.g., in FIG. 3).

The airfoil portion 100 may have various additional characteristics, such as according to the following exemplary embodiments. The airfoil portion 100 may comprise a chord-wise loaded, stacked distribution of sections (as further depicted, e.g., in FIG. 4). The airfoil portion 100 may also include a flare where the pressure-side surface and the suction-side surface intersect at the tip surface, wherein the flare is in a direction of the pressure-side surface. A root portion (not depicted) may be connected to the airfoil portion 100 at the root surface 106, e.g., to form an unshrouded bucket. Furthermore, this root portion may be connected to a rotor (or other component) of a thermo-mechanical turbine, such a gas or steam turbine (not depicted).

Figure 2:
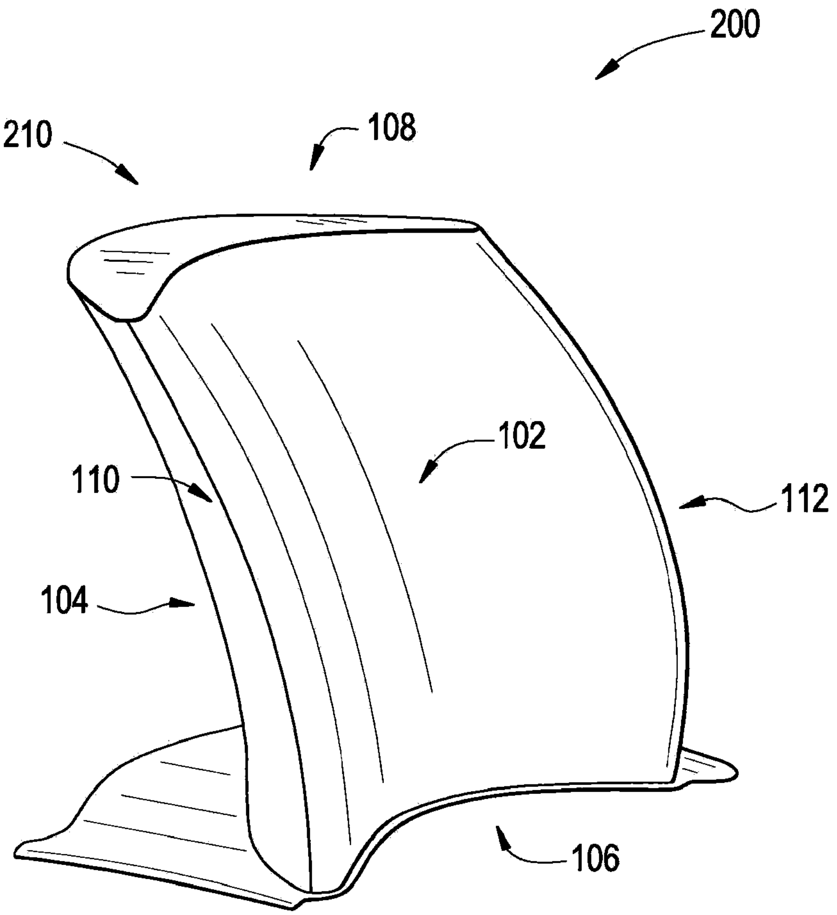
FIG. 2 is a diagram illustrating an alternate exemplary perspective view of an airfoil portion of a turbine bucket in accordance with exemplary embodiments of the invention.

FIG. 2 is diagram illustrating an alternate exemplary perspective view of an airfoil portion 200 in accordance with exemplary embodiments of the invention. As depicted by like reference numbers, airfoil portion 200 is substantially similar to the above described airfoil portion 100. The airfoil portion 200 further includes an increasingly loaded (e.g., aft-loaded) suction-side surface 210 as the suction-side surface 104 approaches the tip surface 108 and the tip surface 108 approaches the trailing edge 112. The airfoil portion 200 further includes a resultant lean in the direction of the suction-side surface 104 as the trailing edge 112 approaches the tip surface 108. Airfoil 200 may further include one or more of the above described variations in accordance with exemplary embodiments of the invention.

FIG. 3 is a line diagram illustrating an exemplary lean profile 300 of the airfoil portion 100 of FIG. 1 in accordance with exemplary embodiments of the invention. The exemplary lean profile 300 includes an exemplary trailing edge lean distribution 302 and leading edge lean distribution 304. An exemplary lean profile (not depicted) for the airfoil 200 would include both a trailing edge lean distribution and a leading edge lean distribution that are similar to the leading edge distribution 304.

Figure 4:
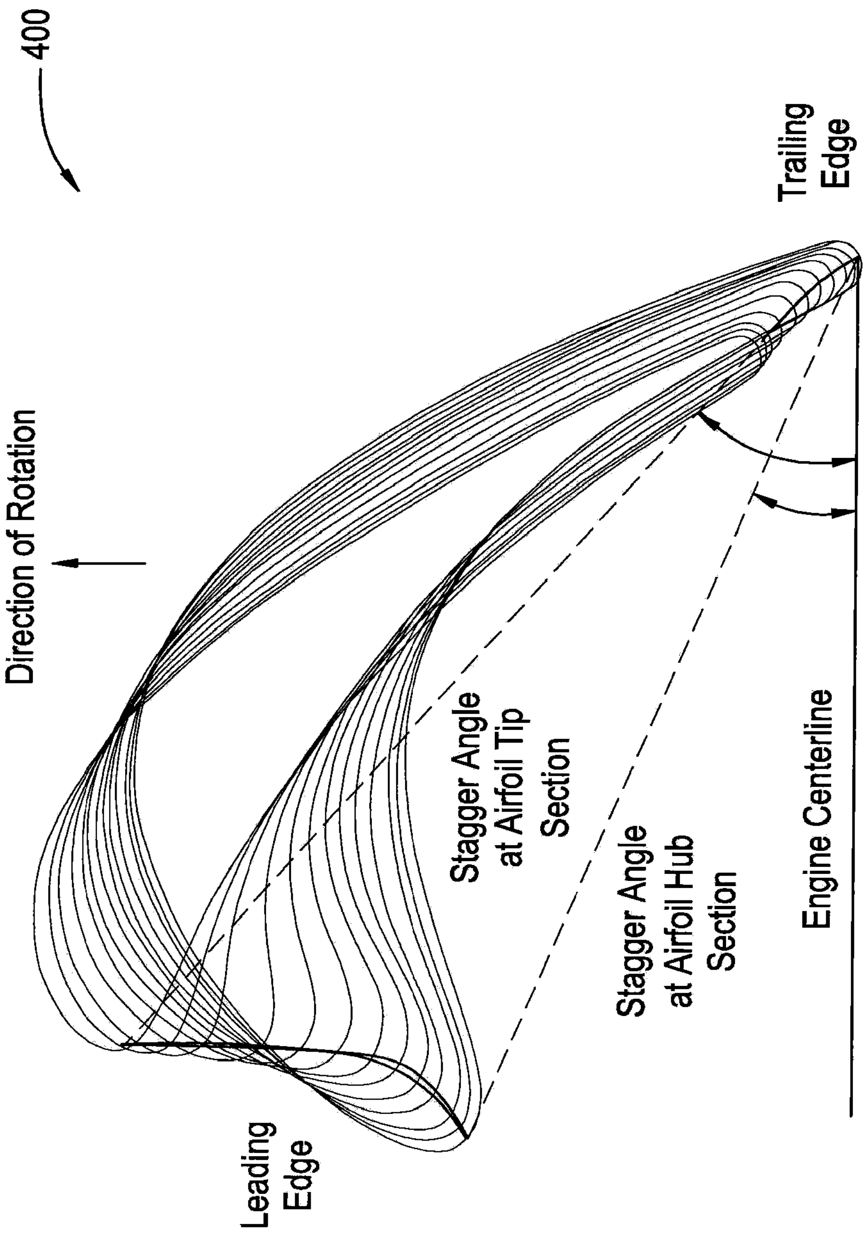
FIG. 4 is a schematic diagram illustrating exemplary details of the airfoil portion of FIG. 1 in accordance with exemplary embodiments of the invention.

FIG. 4 is a schematic diagram illustrating exemplary details 400 of the airfoil portion 100 of FIG. 1 in accordance with exemplary embodiments of the invention. The depicted exemplary details 400 include the above described leading edge, trailing edge, and increasing stagger angle. The chord-wise loaded, stacked distribution of sections is also depicted. Exemplary details (not depicted) for the airfoil portion 200 of FIG. 2 would include similar features to those details 400 depicted in FIG. 4.

Exemplary embodiments of the invention also include a method or process for reducing bucket tip losses (not depicted), which includes providing an airfoil portion 100, 200 as described above for FIGS. 1 and 2 (including exemplary variations). Such exemplary method or process may include execution of a computer program product in some embodiments.

Thus, the technical effect of exemplary embodiments of the invention is a system and method for reducing bucket tip losses, e.g., in a thermo-mechanical turbine. In accordance with such exemplary embodiments, over-tip and tip-vortex losses are reduced, e.g., in unshrouded bucket configurations. Row inlet flow near the bucket tip is redirected inboard, through body-forces, due to a suction-side down stacking arrangement in combination with a decreased over-tip flow coefficient due to a locally decreasing degree or reversed direction of curvature in the near-tip region.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for reducing bucket tip losses comprising an airfoil portion of an unshrouded turbine bucket, the airfoil portion comprising:

a pressure-side surface and a suction-side surface each extending from a root surface to a tip surface and joined at a leading edge and a trailing edge, the pressure-side surface having a generally concave shape, the suction-side surface having a generally convex shape;

the airfoil portion having an increasing stagger angle in a span-wise direction from the root surface to the tip surface and an increasingly loaded suction-side surface as the suction-side surface approaches the tip surface and the tip surface approaches the leading edge, the airfoil portion having a resultant lean in a direction of the suction-side surface as the leading edge approaches the tip surface, and the pressure-side surface and the suction-side surface each having a locally reduced or reversed curvature in a direction of the pressure-side surface at their intersection with the tip surface.

2. The system of claim 1, wherein the airfoil portion comprises a chord-wise loaded, stacked distribution of sections.

3. The system of claim 1, further comprising a root portion connected to the airfoil portion at the root surface.

4. The system of claim 3, wherein the root portion is connected to a rotor of a turbine.

5. The system of claim 1, wherein the airfoil portion further has an increasingly loaded suction-side surface as the suction-side surface approaches the tip surface and the tip surface approaches the trailing edge, the airfoil portion further having a resultant lean in the direction of the suction-side surface as the trailing edge approaches the tip surface.

6. The system of claim 5, wherein the pressure-side surface and the suction-side surface have a flare in a direction of the pressure-side surface at their intersection with the tip surface.

7. The system of claim 5, wherein the airfoil portion comprises a chord-wise loaded, stacked distribution of sections.

8. The system of claim 5, further comprising a root portion connected to the airfoil portion at the root surface.

9. The system of claim 8, wherein the root portion is connected to a rotor of a turbine.

10. A method for reducing bucket tip losses comprising providing an airfoil portion of an unshrouded turbine bucket, the airfoil portion comprising:

a pressure-side surface and a suction-side surface each extending from a root surface to a tip surface and joined at a leading edge and a trailing edge, the pressure-side surface having a generally concave shape and the suction-side surface having a generally convex shape;

the airfoil portion having an increasing stagger angle in a span-wise direction from the root surface to the tip surface and an increasingly loaded suction-side surface as the suction-side surface approaches the tip surface and the tip surface approaches the leading edge, the airfoil portion having a resultant lean in a direction of the suction-side surface as the leading edge approaches the tip surface, and the pressure-side surface and the suction-side surface each having a locally reduced or reversed curvature in a direction of the pressure-side surface at their intersection with the tip surface.

11. The method of claim 10, wherein the airfoil portion comprises a chord-wise loaded, stacked distribution of sections.

12. The method of claim 10, further comprising connecting a root portion to the airfoil portion at the root surface.

13. The method of claim 12, further comprising connecting the root portion to a rotor of a turbine.

14. The method of claim 10, wherein the airfoil portion further has an increasingly loaded suction-side surface as the suction-side surface approaches the tip surface and the tip surface approaches the trailing edge, the airfoil portion further having a resultant lean in the direction of the suction-side surface as the trailing edge approaches the tip surface.

15. The method of claim 14, wherein the pressure-side surface and the suction-side surface have a flare in a direction of the pressure-side surface at their intersection with the tip surface.

16. The method of claim 14, wherein the airfoil portion comprises a chord-wise loaded, stacked distribution of sections.

17. The method of claim 14, further comprising connecting a root portion to the airfoil portion at the root surface.

18. The method of claim 17, further comprising connecting the root portion to a rotor of a turbine.

19. A system for reducing bucket tip losses comprising an airfoil portion of an unshrouded turbine bucket, the airfoil portion comprising:

a pressure-side surface and a suction-side surface each extending from a root surface to a tip surface and joined at a leading edge and a trailing edge, the pressure-side surface having a generally concave shape, the suction-side surface having a generally convex shape;

the airfoil portion having an increasing stagger angle in a span-wise direction from the root surface to the tip surface and an increasingly loaded suction-side surface as the suction-side surface approaches the tip surface and the tip surface approaches the leading edge, the airfoil portion having a resultant lean in a direction of the suction-side surface as the leading edge approaches the tip surface, and the pressure-side surface and the suction-side surface each having a locally reduced or reversed curvature in a direction of the pressure-side surface at their intersection with the tip surface, wherein the leading edge has a lean distribution which is disposed on a suction side of a radial plane of the airfoil portion from the root surface to the tip surface.

* * * * *